United States Patent
Bittner (10) Patent No.: US 12,532,796 B2
(45) Date of Patent: Jan. 27, 2026

(54) SYSTEM AND METHOD FOR AN AGRICULTURAL MACHINE

(71) Applicant: CNH Industrial America LLC, New Holland, PA (US)

(72) Inventor: Roy A. Bittner, Reedsville, WI (US)

(73) Assignee: CNH Industrial America LLC, New Holland, PA (US)

( * ) Notice: Subject to any disclaimer, the term of this patent is extended or adjusted under 35 U.S.C. 154(b) by 164 days.

(21) Appl. No.: 18/587,248

(22) Filed: Feb. 26, 2024

(65) Prior Publication Data
US 2025/0268119 A1    Aug. 28, 2025

(51) Int. Cl.
*A01B 69/04* (2006.01)
*A01M 7/00* (2006.01)

(52) U.S. Cl.
CPC ......... *A01B 69/008* (2013.01); *A01M 7/0057* (2013.01); *A01M 7/0089* (2013.01)

(58) Field of Classification Search
CPC .. A01M 7/0057; A01M 7/0089; A01B 69/008
See application file for complete search history.

(56) References Cited

U.S. PATENT DOCUMENTS

| | | | |
|---|---|---|---|
| 5,988,528 A * | 11/1999 | Krohn | A01M 7/0075 239/168 |
| 6,804,587 B1 * | 10/2004 | O Connor | E02F 9/205 701/50 |
| 6,834,223 B2 | 12/2004 | Strelioff et al. | |
| 7,054,731 B1 * | 5/2006 | Lange | A01B 69/008 701/50 |
| 7,383,114 B1 * | 6/2008 | Lange | A01B 69/008 701/50 |
| 2003/0111546 A1 * | 6/2003 | Schaffter | A01M 7/0089 239/69 |
| 2003/0208311 A1 * | 11/2003 | McClure | A01B 69/004 701/50 |

(Continued)

FOREIGN PATENT DOCUMENTS

| | | | | |
|---|---|---|---|---|
| DE | 102005019238 A1 * | 11/2006 | | A01B 69/004 |
| DE | 102017122420 A1 * | 3/2019 | | A01M 7/0057 |

(Continued)

*Primary Examiner* — John M Zaleskas
(74) *Attorney, Agent, or Firm* — Dority & Manning, P.A.

(57) ABSTRACT

A system for an agricultural machine may include a steering system configured to alter a steering direction of a chassis. A guidance system may be operably coupled with the steering system and configured to alter a steering direction of the machine based on a defined target path for the agricultural machine. A boom assembly may be operably coupled with the chassis. One or more actuators may be operably coupled with the boom assembly and configured to alter a first boom section relative to a second boom section. A computing system may be communicatively coupled to the steering system. The computing system may be configured to receive the defined target path from the guidance system, determine a projected path about the defined target path, generate a steering command based on the projected path, and generate a boom command based at least in part on the steering command and the projected path.

20 Claims, 6 Drawing Sheets

(56) References Cited

U.S. PATENT DOCUMENTS

| | | | | |
|---|---|---|---|---|
| 2004/0158381 | A1* | 8/2004 | Strelioff | A01M 7/0057 340/440 |
| 2006/0282205 | A1* | 12/2006 | Lange | G01C 21/20 701/50 |
| 2009/0204281 | A1* | 8/2009 | McClure | G05D 1/027 701/25 |
| 2010/0185366 | A1* | 7/2010 | Heiniger | A01B 69/008 700/12 |
| 2011/0266365 | A1* | 11/2011 | Hrnicek | A01C 23/008 239/164 |
| 2011/0282554 | A1* | 11/2011 | Keye | A01M 7/0057 701/49 |
| 2013/0008360 | A1* | 1/2013 | Follmer | A01B 69/004 172/1 |
| 2013/0277442 | A1* | 10/2013 | Ballu | A01C 23/00 239/73 |
| 2014/0074360 | A1* | 3/2014 | Rosa | G05D 3/12 701/50 |
| 2016/0243575 | A1* | 8/2016 | Otto | A01C 23/008 |
| 2017/0027103 | A1* | 2/2017 | Grotelueschen | A01M 7/0057 |
| 2018/0317372 | A1* | 11/2018 | Schleicher | A01B 79/005 |
| 2019/0104720 | A1* | 4/2019 | Sullivan | A01M 7/0057 |
| 2019/0351434 | A1* | 11/2019 | Smith | B05B 12/124 |
| 2020/0015413 | A1* | 1/2020 | Otto | A01M 7/0057 |
| 2020/0029484 | A1* | 1/2020 | Weidenbach | A01B 63/24 |
| 2020/0275645 | A1* | 9/2020 | Smith | A01M 7/0057 |
| 2020/0281182 | A1* | 9/2020 | Kiefer | A01M 7/0057 |
| 2020/0315108 | A1* | 10/2020 | Alders | A01M 7/0057 |
| 2021/0037694 | A1* | 2/2021 | Weidenbach | A01D 41/141 |
| 2021/0274773 | A1* | 9/2021 | Sporrer | A01M 7/0089 |
| 2021/0368771 | A1* | 12/2021 | Bittner | A01M 7/0089 |
| 2022/0167543 | A1* | 6/2022 | Bast | G05D 1/65 |
| 2022/0192084 | A1* | 6/2022 | Mizushima | A01M 7/0089 |
| 2022/0203978 | A1* | 6/2022 | Creaby | A01M 7/0057 |
| 2022/0211023 | A1* | 7/2022 | Smith | A01M 7/0057 |
| 2022/0264863 | A1* | 8/2022 | Hafvenstein | B05B 15/65 |
| 2022/0408713 | A1* | 12/2022 | Smith | A01G 25/09 |
| 2023/0055424 | A1* | 2/2023 | Bittner | A01B 69/008 |
| 2023/0059149 | A1* | 2/2023 | Weidenbach | A01M 7/0089 |
| 2023/0210103 | A1 | 7/2023 | Hoeben et al. | |
| 2024/0138396 | A1* | 5/2024 | Brooks | A01M 7/0042 |
| 2024/0166011 | A1* | 5/2024 | Sandey | A01M 7/0089 |
| 2024/0326076 | A1* | 10/2024 | Smith | A01M 7/0057 |

FOREIGN PATENT DOCUMENTS

| | | | | |
|---|---|---|---|---|
| DE | 102020110367 A1 | * | 10/2021 | A01M 9/0092 |
| EP | 3323288 B1 | | 4/2021 | |

* cited by examiner

SYSTEM AND METHOD FOR AN AGRICULTURAL MACHINE

FIELD

The present disclosure generally relates to agricultural machines and, more particularly, to systems and methods for machines including a boom assembly.

BACKGROUND

Various types of machines utilize applicators (e.g., sprayers, floaters, etc.) to deliver an agricultural product to a ground surface of a field. The agricultural product may be in the form of a solution or mixture, with a carrier (such as water) being mixed with one or more active ingredients (such as an herbicide, agricultural product, fungicide, a pesticide, or another product).

The applicators may be pulled as an implement or self-propelled and may include a tank, a pump, a boom assembly, and a plurality of nozzles carried by the boom assembly at spaced locations. The boom assembly may include a pair of boom arms, with each boom arm extending to either side of the applicator when in an unfolded state. Each boom arm may include multiple boom sections, each with a number of spray nozzles (also sometimes referred to as spray tips).

During an application operation, however, various factors may affect a quality of the application of the agricultural product to the field. Accordingly, an improved system and method for monitoring the quality of application of the agricultural product to the field by monitoring deflection (i.e., movement) of the boom assembly would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a system for an agricultural machine that includes a steering system configured to alter a steering direction of a chassis. A boom assembly is operably coupled with the chassis. One or more actuators is operably coupled with the boom assembly and configured to alter a first boom section relative to a second boom section. A computing system is communicatively coupled to the steering system. The computing system is configured to determine a defined target path for the agricultural machine, determine a tangent line defined as a direction of a steering center point of the chassis with the steering system in a defined position, determine a compensation angle defined between an actual boom position and a default boom position based on the defined target path and the tangent line, and generate a boom command to alter a position of the first boom section relative to the second boom section based on the compensation angle.

In some aspects, the present subject matter is directed to a method for an operation of an agricultural machine. The method includes determining, with a machine guidance system, a defined target path for the agricultural machine. The method also includes determining, with a computing system, a tangent line defined as a direction of a steering center point of a chassis of the agricultural machine with a steering system in a defined position. Additionally, the method includes determining, with the computing system, a compensation angle defined between an actual boom position and a default boom position based on the defined target path and the tangent line. Lastly, the method includes generating, with the computing system, a boom command to alter a position of a first boom section of a boom assembly relative to a second boom section of the boom assembly based on the compensation angle.

In some aspects, the present subject matter is directed to a system for an agricultural machine comprising that includes a steering system configured to alter a steering direction of a chassis. A guidance system is operably coupled with the steering system and configured to alter the steering direction of the agricultural machine based on a defined target path for the agricultural machine. A boom assembly is operably coupled with the chassis. One or more actuators is operably coupled with the boom assembly and configured to alter a first boom section relative to a second boom section. A computing system is communicatively coupled to the steering system. The computing system is configured to receive the defined target path from the guidance system, determine a projected path about the defined target path based on a set of points on alternating sides of the defined target path, generate a steering command based on the projected path, and generate a boom command to alter a position of the first boom section relative to the second boom section based at least in part on the steering command and the projected path.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations may be made in the present disclosure without departing from the scope or spirit of the disclosure. For instance, features illustrated or described as part may be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality may be seen as "associated with" each other such that the defined functionality is achieved, irrespective of architectures or intermedial components. Likewise, any two components so associated may also be viewed as being "operably connected" or "operably coupled" to each other to achieve the defined functionality, and any two components capable of being so associated may also be viewed as being "operably couplable" to each other to achieve the defined functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items may be employed by itself, or any combination of two or more of the listed items may be employed. For example, if a composition or assembly is described as containing components A, B, and/or C, the composition or assembly may contain A alone; B alone; C alone; A and B in combination; A and C in combination; B and C in combination; or A, B, and C in combination.

As used throughout this disclosure, the term "autonomous" refers to a vehicle capable of implementing at least one operation without driver input. An "operation" refers to a change in one or more of the steering, braking, acceleration/deceleration of the vehicle, actuation of a component of an implement, actuation of a component of a trailer, and/or actuation of any other component of the vehicle and/or any assembly operably coupled with the vehicle. The term "semi-autonomous" refers to a vehicle capable of implementing at least one operation that is not fully automatic but assists the operator with such operation (e.g., fully operational without a driver or driver input). As such an autonomous vehicle includes those that can operate under operator control during certain time periods and without operator control during other time periods while a semi-autonomous vehicle includes those that can operate under operator control during certain time periods and assist with operator control during other time periods.

In general, the present subject matter is directed to a system for an agricultural machine that may include a steering system configured to alter a steering direction of a chassis. A guidance system may be operably coupled with the steering system and configured to alter a steering direction of the vehicle based on a defined target path for the machine. A boom assembly may be operably coupled with the chassis. One or more actuators may be operably coupled with the boom assembly and configured to alter a first boom section relative to a second boom section. A computing system may be communicatively coupled to the steering system. The computing system may be configured to receive the defined target path from the guidance system, determine a projected path about the defined target path, generate a steering command based on the projected path, and generate a boom command based at least in part on the steering command and the projected path. In various instances, by altering the compensation angle between a default axis of the boom and an adjusted position, the boom assembly may be oriented relative to the actual or intended direction of travel of the machine rather than ninety degrees to the chassis.

Figure 1:
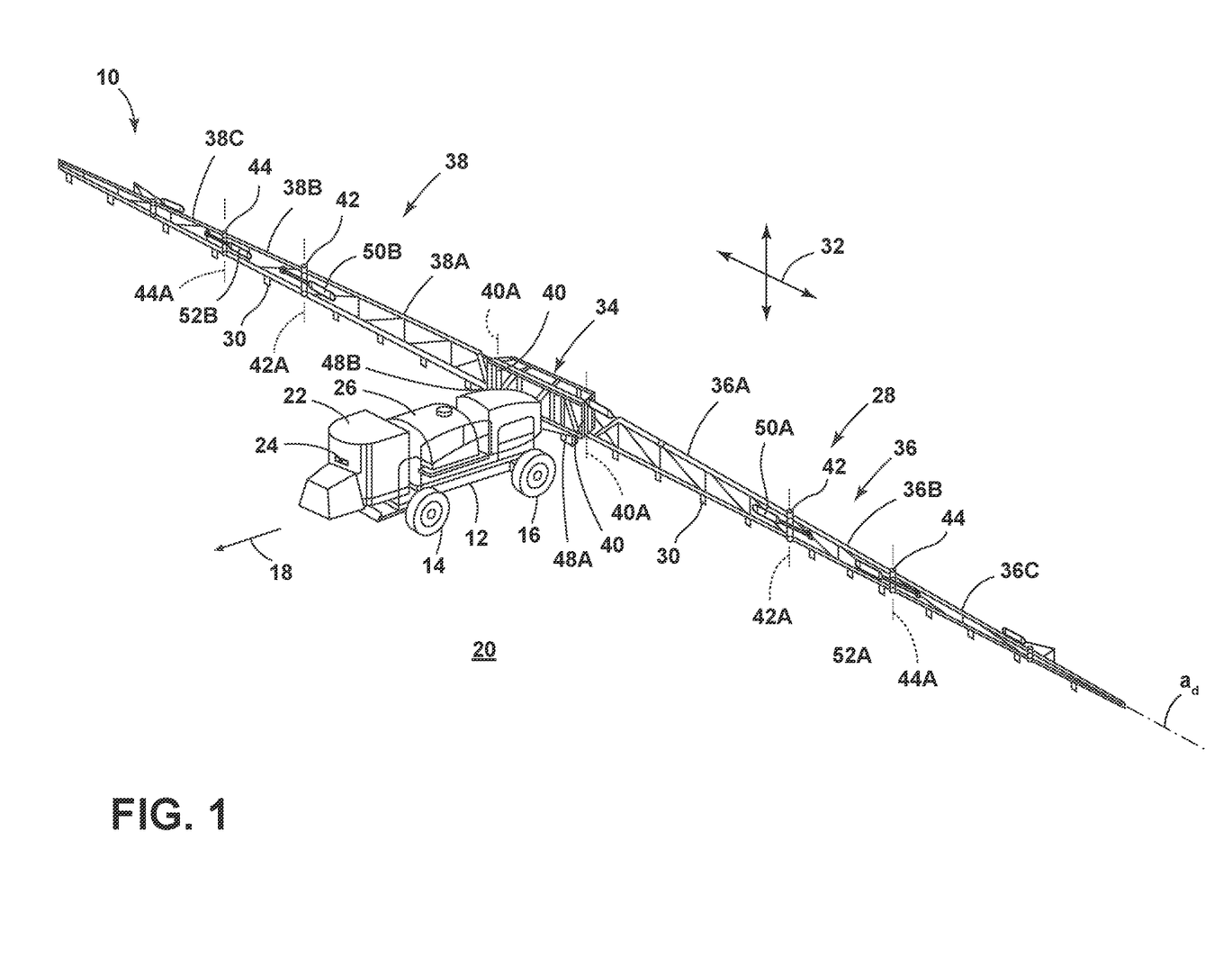
FIG. 1 illustrates a front perspective view of a machine in accordance with aspects of the present subject matter.
Figure 2:
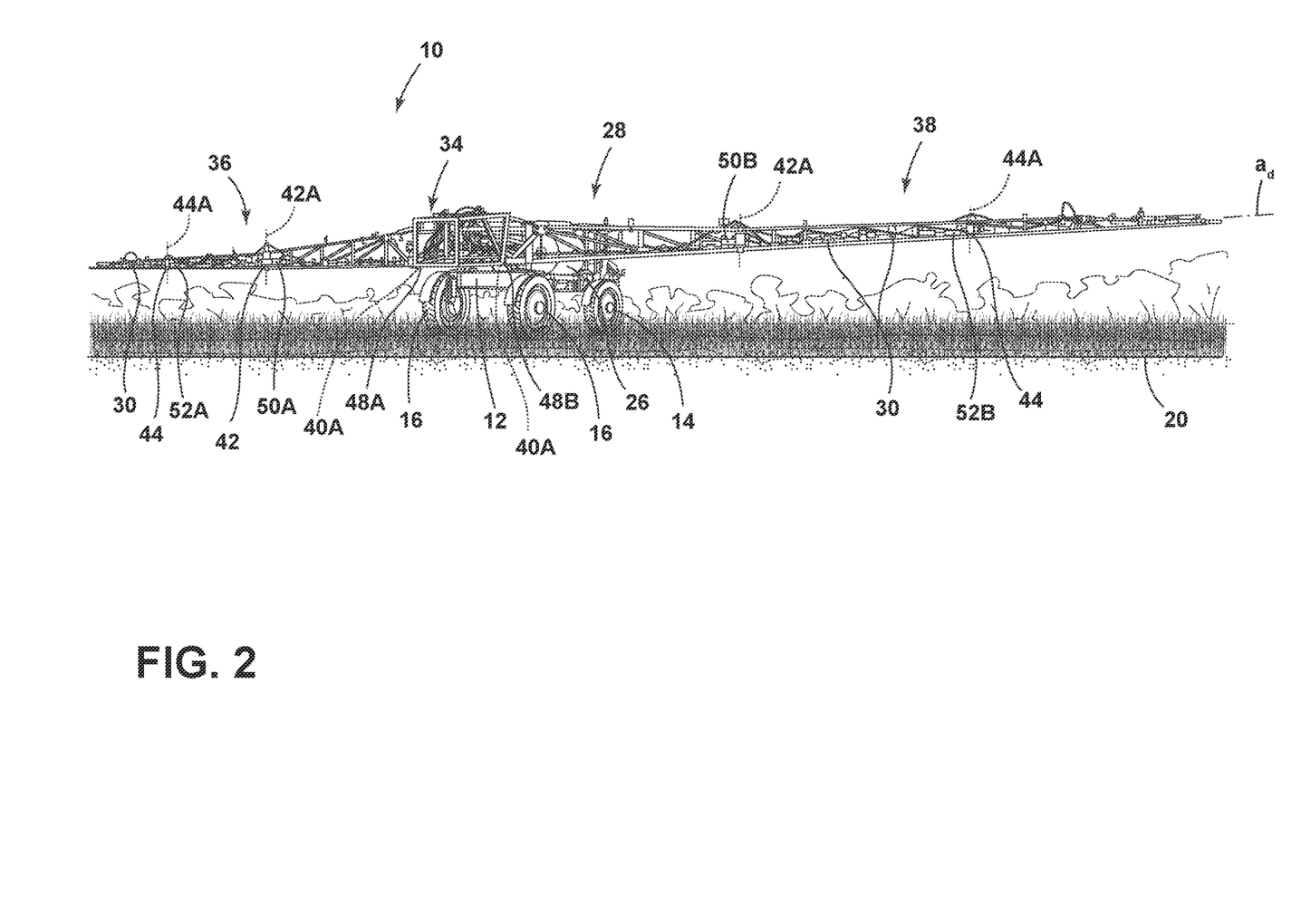
FIG. 2 illustrates a rear perspective view of the machine in accordance with aspects of the present subject matter.
Figure 3:
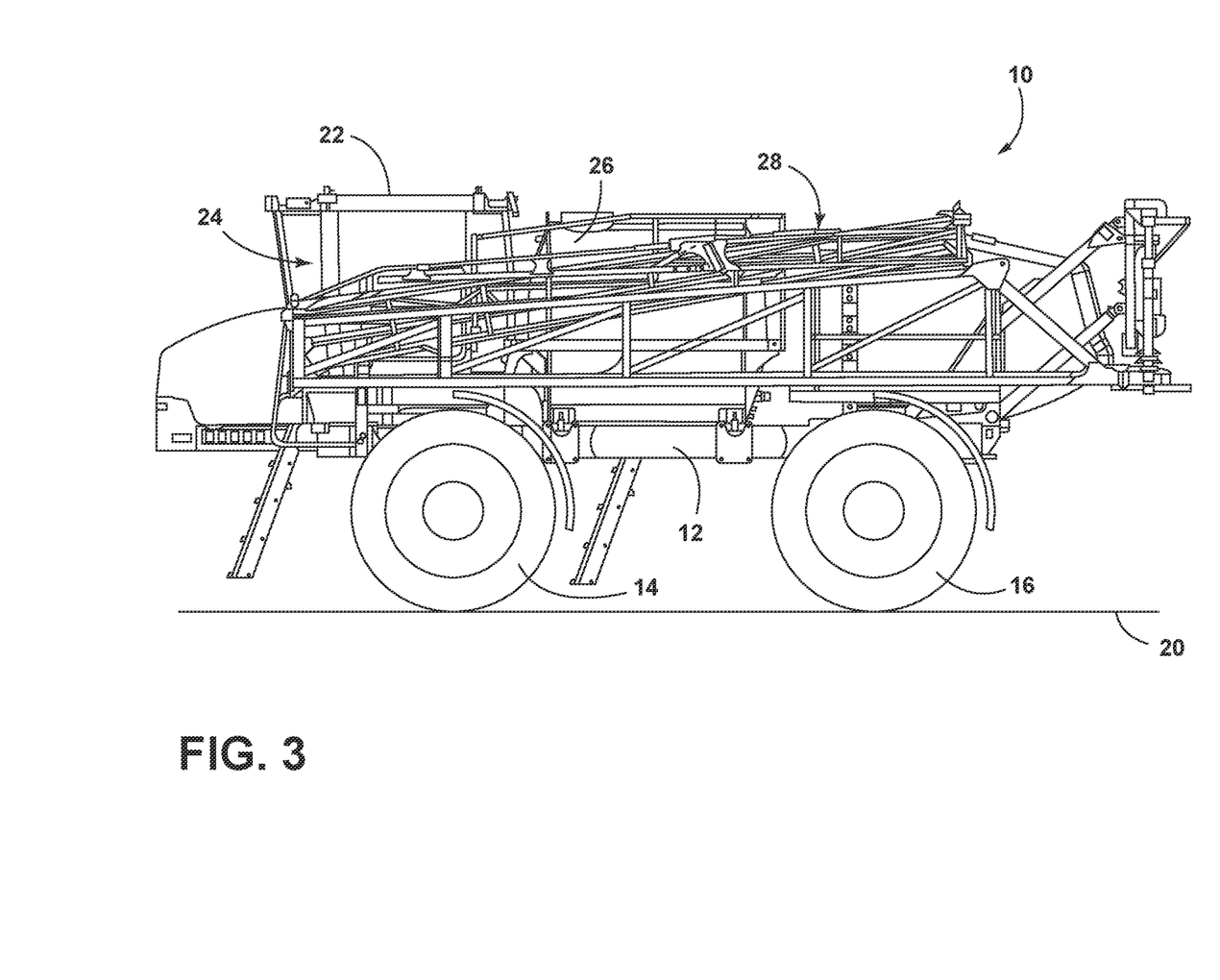
FIG. 3 illustrates a side view of the machine in accordance with aspects of the present subject matter.

Referring now to FIGS. 1-3, differing views of a machine 10 are illustrated in accordance with aspects of the present subject matter. As shown, FIG. 1 illustrates a front perspective view of the machine with a boom assembly in a working or unfolded position, FIG. 2 illustrates a rear perspective view of the machine with a boom assembly in a working or unfolded position, and FIG. 3 illustrates a side view of the machine with a boom assembly in a transport or folded position. In the illustrated examples, the machine is configured as a self-propelled machine. However, in alternative embodiments, the machine may be configured as any other suitable type of machine configured to perform agricultural spraying operations, such as a tractor or other machine configured to haul a spraying or application implement.

As shown in FIGS. 1 and 2, the machine 10 may include a chassis 12 configured to support or couple to a plurality of components. For example, front wheels 14 and rear wheels 16 may be coupled to the chassis 12. The wheels 14, 16 may be configured to support the machine 10 relative to the field 20 and move the machine 10 in a direction of travel (e.g., as indicated by arrow 18 in FIG. 1) across the field 20.

The chassis 12 may also support an operator's cab 22 that houses various control or input devices (e.g., levers, pedals, control panels, buttons, and/or the like) for permitting an operator to control the operation of the machine 10. For instance, as shown in FIG. 1, the machine 10 may include a human-machine or user interface 24 for displaying message windows and/or alerts to the operator and/or for allowing the operator to interface with the machine's controller or computing system.

Furthermore, the chassis 12 may also support one or more tanks 26, which may be in the form of a product tank and/or an auxiliary tank. Each product tank is generally configured to store or hold an agricultural product, such as a pesticide, an herbicide, a nutrient, and/or the like. The auxiliary tank may be configured to store or hold clean water and/or any other product, which may be different from the agricultural product within the product tank.

The chassis 12 may further support a boom assembly 28 operably mounted to the chassis 12. A plurality of nozzle assemblies 30 are mounted on the boom assembly 28 and configured to selectively dispense the agricultural product stored in the one or more tanks 26 via the nozzle assemblies 30 onto underlying plants and/or soil. The nozzle assemblies 30 are generally spaced apart from each other on the boom assembly 28 along a lateral direction 32. Furthermore, fluid conduits may fluidly couple the nozzle assemblies 30 to the tank(s) 26. Each nozzle assembly 30 may include a nozzle valve and an associated spray tip or spray nozzle. In several embodiments, the operation of each nozzle valve may be individually controlled by an associated controller or computing system such that the valve regulates the flow rate and/or another spray characteristic of the agricultural product through the associated spray nozzle.

As shown in FIGS. 1 and 2, in various embodiments, the boom assembly 28 includes a central boom section 34, a first (left) boom arm 36, and/or a second (right) boom arm 38. The left boom arm 36 includes a left inner boom section 36A pivotably coupled to the central boom section 34, a left middle boom section 36B pivotably coupled to the left inner boom section 36A, and a left outer boom section 36C pivotably coupled to the left middle boom section 36B. Similarly, the right boom arm 38 includes a right inner boom section 38A pivotably coupled to the central boom section 34, a right middle boom section 38B pivotably coupled to the right inner boom section 38A, and a right outer boom section 38C pivotably coupled to the right middle boom section 38B. Each of the inner boom sections 36A, 38A is pivotably coupled to the central boom section 34 at joints 40. Similarly, the middle boom sections 36B, 38B are pivotably coupled to the respective inner boom sections 36A, 38A at joints 42 while the outer boom sections 36C, 38C are pivotably coupled to the respective middle boom sections 36B, 38B at joints 44.

The joints 40, 42, 44 may be configured to allow relative motion between adjacent boom sections of the boom assembly 28. For example, the joints 40, 42, 44 may allow for articulation of the various boom sections between an extended or working position (e.g., as shown in FIGS. 1 and 2), in which the boom sections are unfolded along the lateral direction 32 to allow for the performance of an agricultural spraying operation, and a transport position (FIG. 3), in which the boom sections are folded inwardly to reduce the overall width of the boom assembly 28 along the lateral direction 32. Although the boom assembly 28 is shown in FIGS. 1-3 as including a central boom section 34 and three individual boom sections coupled to each side of the central boom section 34, the boom assembly 28 may generally have any suitable number of boom sections. For example, each boom arm 36, 38 may include four or more boom sections or less than three boom sections.

In various examples, the boom assembly 28 may include one or more actuators 46 that may be configured to alter a first boom portion relative to a second portion section. For example, the first boom portion may be at least a portion of a boom arm (e.g., the first boom arm 36 and/or the second boom arm 38) and the second boom portion is the central boom section 34. To this end, the boom assembly 28 may include inner fold actuators 48A, 48B coupled between the inner boom sections 36A, 38A and the central boom section 34 to enable pivoting or folding between the extended working position and the transport position. For example, by retracting/extending the inner fold actuators 48A, 48B, the inner boom sections 36A, 38A may be pivoted or folded relative to the central boom section 34 about a pivot axis 40A respectively defined by the joints 40. Moreover, the boom assembly 28 may also include middle fold actuators 50A, 50B coupled between each inner boom section 36A, 38A and its adjacent middle boom section 36B, 38B and outer fold actuators 52A, 52B coupled between each middle boom section 36B, 38B and its adjacent outer boom section 36C, 38C. As such, by retracting/extending the middle and outer fold actuators 50A, 50B, 52A, 52B, each middle and outer boom section 36B, 38B, 36C, 38C may be pivoted or folded relative to its respective inwardly adjacent boom section 36A, 38A, 36B, 38B about a respective pivot axis 42A, 44A. In various examples, any of the actuators 48A, 48B, 50A, 50B, 52A, 52B described herein may be configured as hydraulic cylinders. However, it will be appreciated that different actuators 48A, 48B, 50A, 50B, 52A, 52B may be used in other examples. For example, any of the actuators 48A, 48B, 50A, 50B, 52A, 52B may be configured as electric actuators, pneumatic cylinders, pulley systems, and/or any other practicable device.

With further reference to FIGS. 1-3, in various instances, each boom arm 36, 38 may extend along a default axis $a_d$. In various examples, the default axis $a_d$ may generally be offset ninety degrees and/or any other angle relative to the machine travel direction 18 such that the default axis $a_d$ is generally aligned with the lateral direction 32. However, through actuation of any of the actuators 48A, 48B, 50A, 50B, 52A, 52B described herein, a yaw position of the boom assembly 28 may be altered thereby offsetting a portion of the boom (e.g., the first boom arm 36 or a section thereof, the second boom arm 38 or a section thereof, etc.) from the default axis $a_d$ in a fore-aft direction.

Figure 4:
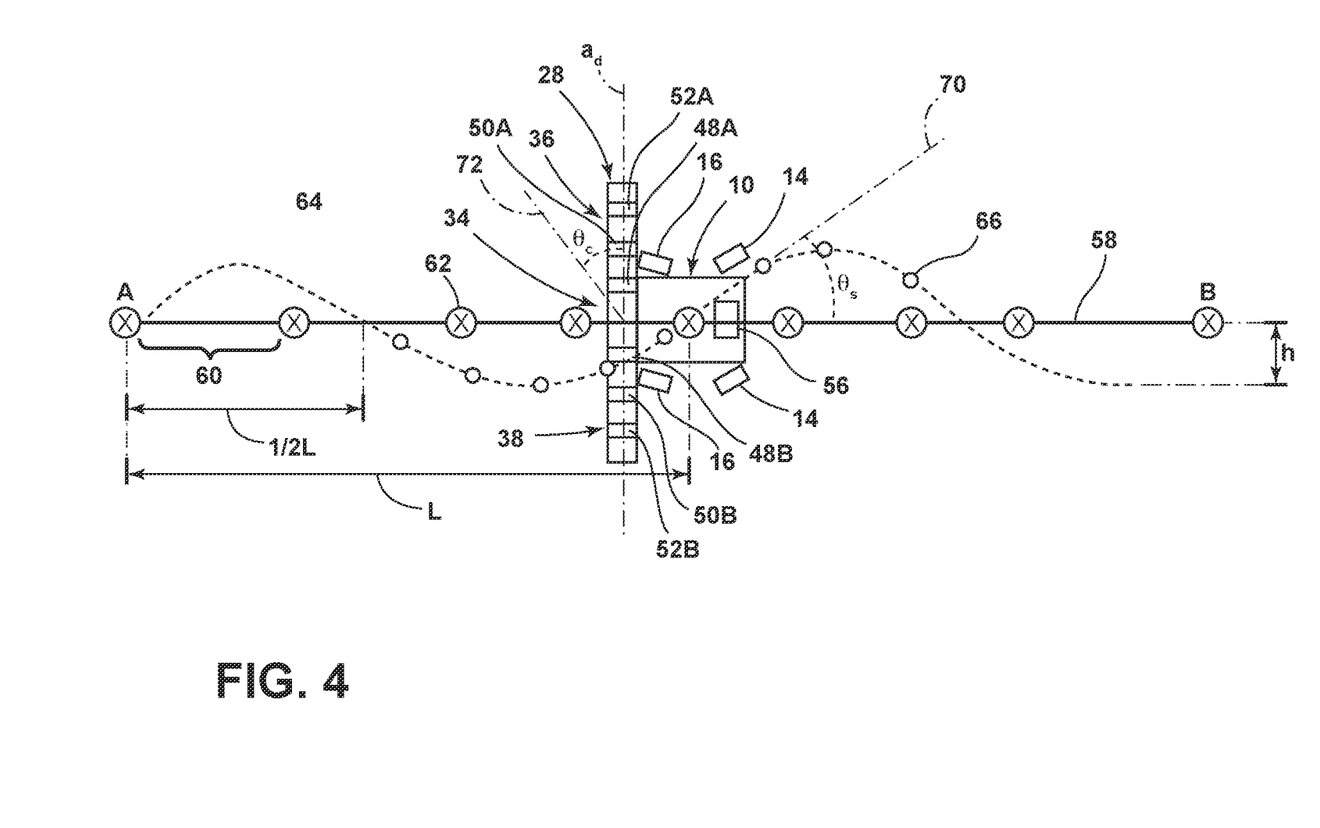
FIG. 4 illustrates a schematic diagram of a guidance system of the machine in accordance with aspects of the present subject matter.

Referring now to FIG. 4, in some instances, the machine 10 can include a guidance system 56 that allows the machine 10 to be guided according to a map. In some cases, the guidance system 56 may allow for the machine 10 to be operated in a manually operated mode or an autonomous (or semi-autonomous) mode.

In some examples, a target path, or an A-B line 58, may be approximately defined by a series of line segments 60 defined by points 62 to form the A-B line 58. In some cases, the guidance system 56 may reference data provided by the map to determine a projected path, such as an oscillatory path 64 along A-B line 58. The oscillatory path 64 may be predetermined based on A-B line 58. In some cases, data points 66 may connect to form the oscillatory path 64. The guidance system 56 may steer the machine 10 from one data point 66 to the next adjacent data point 66, such that the machine 10 crosses the A-B line 58 in a periodic pattern that may be generally symmetrical about the A-B line 58. The guidance system 56 may apply an algorithm and/or any other process to calculate a characteristic frequency, or interval L versus time, and amplitude h, to steer the machine 10 along the oscillatory path 64 with reference to the A-B line 58.

In various examples, a steering system 68 may hydraulically or electronically adjust the direction of the front wheels 14 and/or the rear wheels 16. In some cases, a tangent line 70 may be defined as the direction of a steering center point of the chassis 12 with the steering system in a defined position. As such, as the steering system alters a direction of the front wheels 14 and/or the rear wheels 16, a steering angle $\theta_s$ defined between the tangent line 70 and the A-B line 58 may also be altered.

In various instances, the fold actuators 48A, 48B, 50A, 50B, 52A, 52B may be adjusted to place the boom assembly 28 in a position (e.g., perpendicular) relative to the tangent line 70. For instance, any of the fold actuators 48A, 48B, 50A, 50B, 52A, 52B may be adjusted to allow the boom assembly 28 to be placed in a compensation angle $\theta_c$ that is defined between a line 72 that is perpendicular to the tangent line 70 and the default axis $a_d$ of the boom assembly 28. In some cases, the compensation angle $\theta_c$ may have an absolute value that is generally equal to the tangent angle.

While FIG. 4 illustrates the A-B line 58 as a straight line, the A-B line 58 may have an irregular or non-uniform contour, as the contour of the A-B line 58 may be dependent upon variations in elevation in field 20. For instance, the field 20 may include hills and valleys and other naturally occurring contours, resulting in a line that is not straight. Even in a level field 20, the A-B line 58 may deviate from a straight line due to irregular boundary lines that may prevent or inhibit straight line trajectories. Thus, the oscillatory path 64 may not appear to be sinusoidal due to undulations or perturbances in the profile of the A-B line 58.

Figure 5:
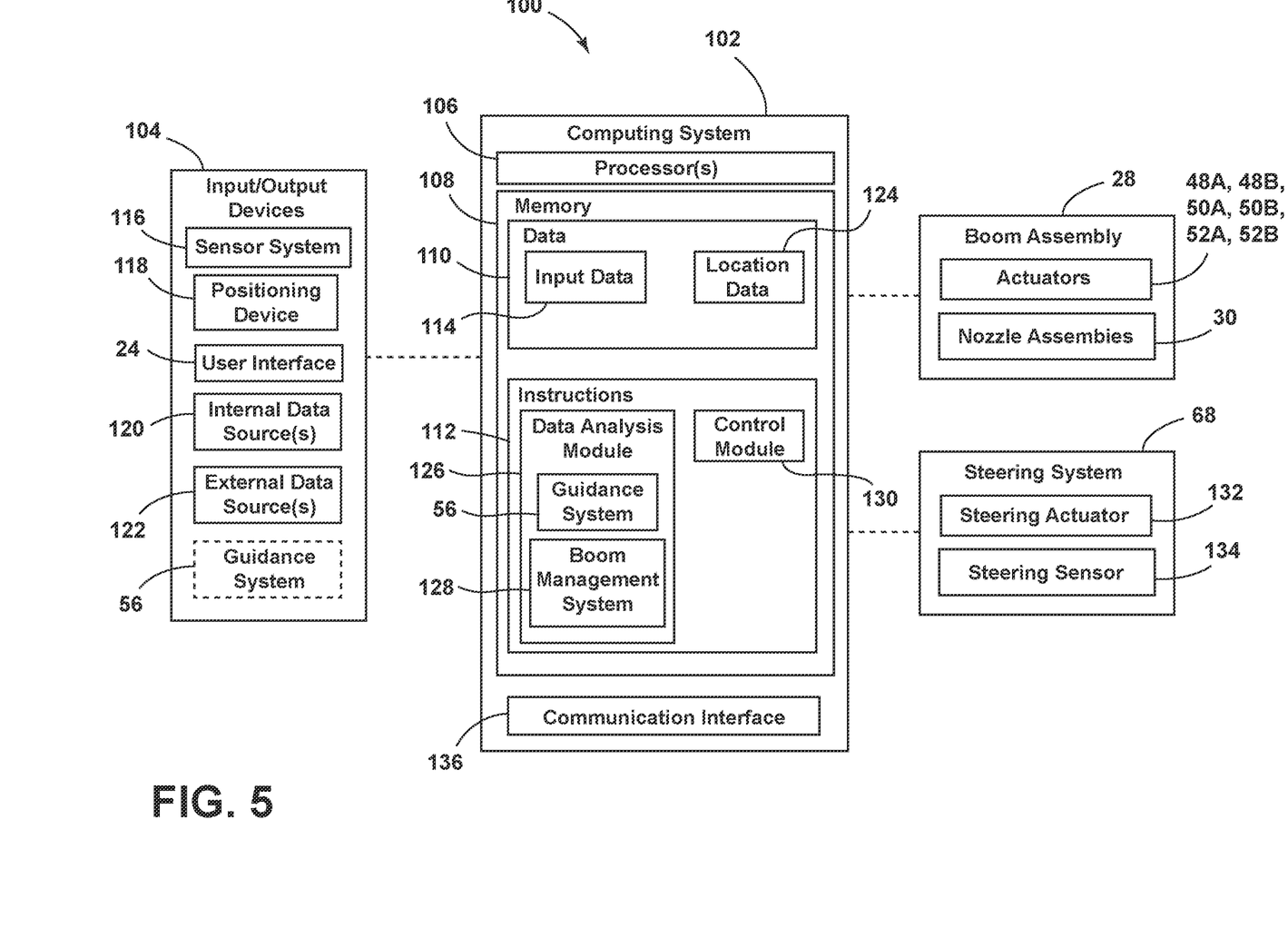
FIG. 5 illustrates a schematic diagram of a system for an agricultural machine in accordance with aspects of the present subject matter.

Referring now to FIG. 5, a schematic view of a system 100 for an agricultural machine 10 is illustrated in accordance with aspects of the present subject matter. The system 100 will generally be described herein with reference to the agricultural machine 10 described above with reference to FIGS. 1-4. However, the disclosed system 100 may generally be utilized with agricultural machines having any other suitable machine configuration.

As shown in FIG. 5, the system 100 may include a computing system 102 operably coupled with various input/output devices 104 and one or more actuators 48A, 48B, 50A, 50B, 52A, 52B operably coupled with the boom assembly 28. In general, the computing system 102 may correspond to any suitable processor-based device(s), such as a computing device or any combination of computing devices. For example, the computing system 102 may generally include one or more processors 106 and one or more associated memory 108 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 108 may generally include memory element(s) including, but not limited to, computer-readable medium (e.g., random access memory (RAM)), computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 108 may generally be configured to store information accessible to the processors 106, including data 110 that may be retrieved, manipulated, created, and/or stored by the processors 106 and instructions 112 that may be executed by the processors 106.

In several examples, the data 110 may be stored in one or more databases. For example, the memory 108 may include an input database 114 for storing input data received from the input/output devices 104. For example, the input/output devices 104 may include a sensor system 116, which may include one or more sensors configured to monitor a position of the first boom section (e.g., 36A) and/or the second boom section (e.g., 36B) (or any other data), one or more positioning devices 118 for generating position data associated with the location of the machine 10, one or more user interfaces 24 for allowing operator inputs to be provided to the computing system 102 (e.g., buttons, knobs, dials, levers, joysticks, touch screens, and/or the like), one or more other internal data sources 120 associated with the machine 10 (e.g., other devices, databases, etc.), one or more external data sources 122 (e.g., a remote computing device or server), and/or any other suitable input/output devices 104. The data received from the input/output devices 104 may, for example, be stored within the input database 114 for subsequent processing and/or analysis. It will be appreciated that, in addition to being considered an input/output devices 104 that allows an operator to provide inputs to the computing system 102, any of the input/output devices 104 may also function as an output device. For example, the user interface 24 may be configured to allow the computing system 102 to provide feedback to the operator (e.g., visual feedback via a display or other presentation device, audio feedback via a speaker or other audio output device, and/or the like).

Moreover, in several examples, the memory 108 may also include a location database 124 storing location information about the machine 10 and/or information about the field 20 being processed (e.g., a field map). Such location database 124 may, for example, correspond to a separate database or may form part of the input database 114. As shown in FIG. 5, the computing system 102 may be communicatively coupled to the positioning devices 118 installed on or within the machine 10. For example, in some examples, the positioning devices 118 may be configured to determine the location of the machine 10 using a satellite navigation position system (e.g., a GPS, a Galileo positioning system, the Global Navigation Satellite System (GLONASS), the BeiDou Satellite Navigation and Positioning system, and/or the like). In such an example, the location determined by the positioning devices 118 may be transmitted to the computing system 102 (e.g., in the form of coordinates) and subsequently stored within the location database 124 for subsequent processing and/or analysis.

Additionally, in several examples, the location data stored within the location database 124 may also be correlated to all or a portion of the input data stored within the input database 114. For instance, in some examples, the location coordinates derived from the positioning devices 118 and the data received from the input/output devices 104 may both be time-stamped. In such an example, the time-stamped data may allow the data received from the input/output devices 104 to be matched or correlated to a corresponding set of location coordinates received from the positioning devices 118, thereby allowing the precise location of the portion of the field 20 associated with the input data to be known (or at least capable of calculation) by the computing system 102.

Moreover, by matching the input data to a corresponding set of location coordinates, the computing system 102 may also be configured to generate or update a corresponding field map associated with the field 20 being processed. For example, in instances in which the computing system 102 already includes a field map stored within its memory 108 that includes location coordinates associated with various points across the field 20, the input data received from the input/output devices 104 may be mapped or correlated to a given location within the field map. Alternatively, based on the location data and the associated image data, the computing system 102 may be configured to generate a field map for the field 20 that includes the geo-located input data associated therewith.

Referring still to FIG. 5, in several examples, the instructions 112 stored within the memory 108 of the computing system 102 may be executed by the processors 106 to implement a data analysis module 126. In general, the data analysis module 126 may be configured to analyze the input data (e.g., a set of input data received at a given time or within a given time period or a subset of the data, which may be determined through a pre-processing method) to determine a control output using any algorithm and/or data processing technique. In various examples, the data analysis module 126 may implement machine learning engine methods and algorithms that utilize one or several machine learning techniques including, for example, decision tree learning, including, for example, random forest or conditional inference trees methods, neural networks, support vector machines, clustering, and Bayesian networks. These algorithms may include computer-executable code that may be retrieved by the computing system 102 and may be used to generate subsequent instructions 112.

In some examples, the data analysis module 126 may include the guidance system 56. In such examples, the guidance system 56 may receive the location data and define one or more A-B lines 58 (FIG. 4). In turn, the guidance system 56 may determine the projected path (e.g., an oscillatory path 64 (FIG. 4)) based on the one more A-B lines 58 (FIG. 4). Based on location data, the one or more A-B lines 58 (FIG. 4), and/or the oscillatory paths 64 (FIG. 4), a steering command may be determined by guidance system 56. As the machine 10 traverses the field 20, the guidance system 56 may monitor the data and determine any adjustments to the projected path (FIG. 4), e.g., interval L and/or amplitude h of the oscillatory path 64. In some instances, the guidance system 56 may be implemented within the computing system 102 of the agricultural machine 10, or the guidance system 56 may correspond to one or more separate processing devices. For instance, in some examples, the guidance system 56 may form all or part of a separate plug-in module or computing device(s) that is installed relative to the machine 10 to allow for the disclosed system 100 and method to be implemented without requiring additional software to be uploaded onto existing control devices of the machine 10.

In some cases, the data analysis module 126 may also include a boom management system 128. The boom management system 128 is configured to determine a compensation angle $\theta_c$ (FIG. 4) based at least in part on the steering command, such as a steering command determined by the guidance system 56. As provided herein, a tangent line 70 (FIG. 4) may be defined as the direction of a steering center point of the chassis 12 with the steering system in a defined position. In turn, the boom management system 128 may determine a compensation angle $\theta_c$ (FIG. 4), which may be equal to a steering angle $\theta_s$ defined between the tangent line 70 and a defined target path. In some cases, the compensation angle $\theta_c$ (FIG. 4) is defined between a line 72 perpendicular to the tangent line 70 and the default axis $a_d$ of the boom assembly 28.

Referring still to FIG. 5, the instructions 112 stored within the memory 108 of the computing system 102 may also be executed by the processors 106 to implement a control module 130. In general, the control module 130 may be configured to adjust the operation of the machine 10 by controlling one or more components of the machine 10. For example, the control module 130 may alter a steering direction of the steering system 68 to cause the machine 10 to follow a path in the field 20 that approximately corresponds to or substantially coincides with the oscillatory path 64 (FIG. 4) based on a defined steering command. Additionally or alternatively, the control module 130 may actuate one or more actuators 48A, 48B, 50A, 50B, 52A, 52B of the boom assembly 28 to adjust the compensation angle $\theta_c$.

In several examples, the steering system 68 may include a steering actuator 132 configured to adjust the direction of travel 18 of the machine 10. For instance, the direction of travel 18 of the machine 10 may generally correspond to the direction of the steerable wheels 14, 16 (FIG. 1) (e.g., which may generally correspond with the tangent line 70 (FIG. 4)). In this regard, when the machine 10 is turned or its direction of travel 18 is otherwise changed, the steering actuator 132 may be configured adjust the orientation of the steerable wheels 14, 16 (FIG. 1) relative to the chassis 12 (FIG. 1). In several examples, the steering actuator 132 may be configured to pivot or otherwise rotate the steerable wheels 14, 16 (FIG. 1) relative to the chassis 12 (FIG. 1) based on a received input (e.g., from a steering wheel or control signals from the guidance system 56) in a manner that aligns a direction of the machine 10 with the intended direction of travel of the machine 10. Furthermore, when the machine 10 is being turned, a steering angle $\theta_s$ may be defined between the tangent line 70 and the A-B line 58 (FIG. 4). Increasing the steering angle $\theta_s$ relative to the A-B line 58 may generally decrease the turning radius of the machine 10 (i.e., the turn is "sharper"). Conversely, decreasing the steering angle $\theta_s$ relative to the A-B line 58 may generally increase the turning radius of the machine 10 (i.e., the turn is "wider"). It will be appreciated that the steering actuator 132 may correspond to an electric motor, a linear actuator, a hydraulic cylinder, a pneumatic cylinder, or any other suitable actuator coupled to a suitable mechanical linkage or assembly, such as a rack and pinion or a worm gear train. In some cases, a position of the steering actuator 132 may be determined based on data provided by a steering sensor 134. The steering sensor 134 may be configured as a potentiometer configured to detect the relative movement of the steering actuator 132. However, the steering sensor 134 may be configured as any other suitable type of sensor.

Moreover, as shown in FIG. 5, the computing system 102 may also include a communications interface 136 to communicate with any of the various other system components described herein. For instance, one or more communicative links or interfaces (e.g., one or more data buses and/or wireless connections) may be provided between the communications interface 136 and the input/output devices 104 to allow data transmitted from the input/output devices 104 to be received by the computing system 102. Additionally, as shown in FIG. 5, one or more communicative links or interfaces (e.g., one or more data buses and/or wireless connections) may be provided between the communications interface 136 and the latch system 86 to control the operation of such system components.

In operation, the computing system 102 may determine a defined target path (A-B line 58) of the machine 10. In turn, the computing system 102 may determine a tangent line 70 defined as the direction of a steering center point of the chassis 12 with the steering system in a defined position. In some instances, the computing system 102 may determine a compensation angle $\theta_c$ defined between an actual boom position and a default boom position based on the defined target path and the tangent line 70. Additionally, the computing system 102 may generate a boom command to alter a position of the first boom section relative to the second boom section based on the compensation angle $\theta_c$. Moreover, the computing system 102 may execute the boom command by actuating the one or more actuators 48A, 48B, 50A, 50B, 52A, 52B.

In some cases, the defined target path is determined based on outputs from the guidance system 56. In such instances, the guidance system 56 may be configured to receive location data representative of a position of the chassis 12 in a field 20, retrieve map data defining the defined target path for the machine 10, determine an oscillatory path 64 about the defined target path based on a set of points 66 on alternating sides of the defined target path, and generate the steering command based on the oscillatory path 64. In some instances, the computing system 102 may execute the steering command by the steering system 68 of the machine 10 to steer the machine 10 along a path that corresponds to the oscillatory path 64.

Figure 6:
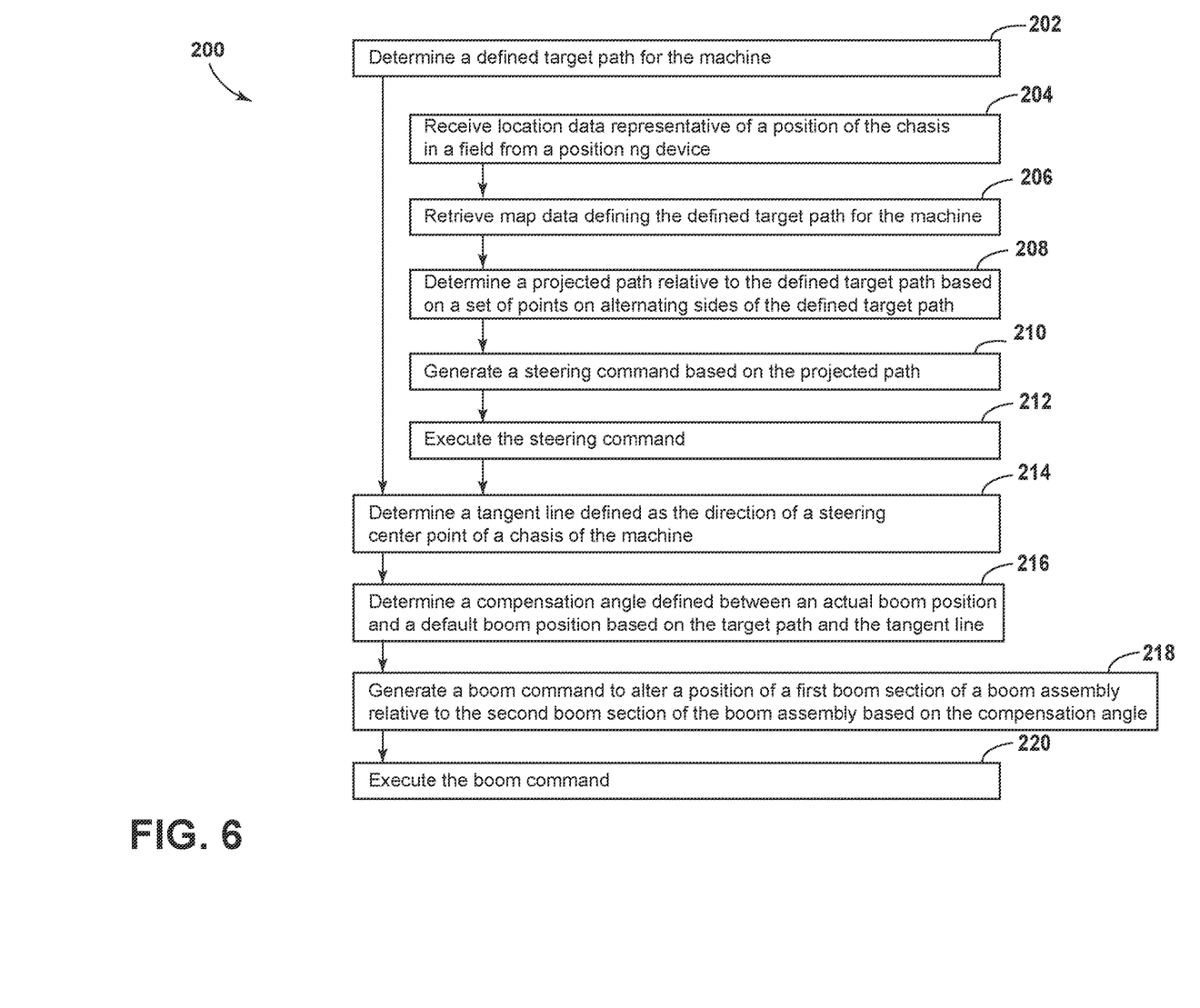
FIG. 6 illustrates a flow diagram of a method for the operation of an agricultural machine in accordance with aspects of the present subject matter.

Referring now to FIG. 6, a flow diagram of some examples of a method 200 for the operation of an agricultural machine is illustrated in accordance with aspects of the present subject matter. In general, the method 200 will be described herein with reference to the machine 10 and the system 100 described above with reference to FIGS. 1-5. However, the disclosed method 200 may generally be utilized with any suitable machine 10 and/or may be utilized in connection with a system having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein may be omitted, rearranged, combined, and/or adapted in various ways without deviating from the scope of the present disclosure.

As shown in FIG. 6, at (202), the method 200 may include determining a defined target path for the machine with a machine guidance system. As provided herein, in some cases, the guidance system may allow for the machine to be operated in a manually operated mode or an autonomous (or semi-autonomous) mode.

In some examples, at (204), the method 200 can include receiving location data representative of a position of the chassis in a field from a positioning device. At (206), the method 200 can include retrieving map data defining the defined target path for the machine with the computing system. At (208), the method 200 can include determining a projected path relative to the defined target path based on a set of points on alternating sides of the defined target path with the computing system. At (210), the method 200 can include generating a steering command based on the projected path with the computing system. At (212), the method 200 can include executing the steering command by the steering system of the machine to steer the machine along a path that corresponds to the oscillatory path with the computing system.

At (214), the method 200 can include determining a tangent line defined as the direction of a steering center point of a chassis of the machine with a steering system in a defined position with the computing system. In turn, at (216), the method 200 can include determining a compensation angle defined between an actual boom position and a default boom position based on the defined target path and the tangent line with the computing system. In some cases, the compensation angle may be equal to a steering angle defined between the tangent line and a defined target path.

At (218), the method 200 can include generating a boom command to alter a position of a first boom section of a boom assembly relative to the second boom section of the boom assembly based on the compensation angle with the computing system. At (220), the method 200 can include executing the boom command by actuating the one or more actuators with the computing system. As provided herein, the boom assembly includes one or more nozzle assemblies such that a spray pattern emitted from the nozzle assemblies relative to the field may be adjusted based on the boom command.

In various examples, the method 200 may implement machine learning methods and algorithms that utilize one or several machine learning techniques including, for example, decision tree learning, including, for example, random forest or conditional inference trees methods, neural networks, support vector machines, clustering, and Bayesian networks. These algorithms may include computer-executable code that may be retrieved by the computing system and/or through a network/cloud and may be used to evaluate and update the adjustment model. In some instances, the machine learning engine may allow for changes to the adjustment model to be performed without human intervention.

It is to be understood that the steps of any method disclosed herein may be performed by a computing system upon loading and executing software code or instructions that are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions that are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for an agricultural machine comprising:
   a steering system configured to alter a steering direction of a chassis;
   a boom assembly operably coupled with the chassis;
   one or more actuators operably coupled with the boom assembly and configured to alter a first boom section relative to a second boom section; and
   a computing system communicatively coupled to the steering system, the computing system being configured to:
     determine a defined target path for the agricultural machine;
     determine a tangent line defined as a direction of a steering center point of the chassis with the steering system in a defined position;
     determine a compensation angle defined between an actual boom position and a default boom position based on the defined target path and the tangent line; and
     generate a boom command to alter a position of the first boom section relative to the second boom section based on the compensation angle.

2. The system of claim 1, wherein the computing system is further configured to:
   execute the boom command by actuating the one or more actuators.

3. The system of claim 1, further comprising:
   a guidance system, wherein the defined target path is determined based on outputs from the guidance system.

4. The system of claim 3, wherein the guidance system is configured to:
   receive location data representative of a position of the chassis in a field;
   retrieve map data defining the defined target path for the agricultural machine;
   determine an oscillatory path about the defined target path based on a set of points on alternating sides of the defined target path; and
   generate a steering command based on the oscillatory path.

5. The system of claim 4, wherein the computing system is further configured to:
   execute the steering command by the steering system of the agricultural machine to steer the agricultural machine along a path that corresponds to the oscillatory path.

6. The system of claim 1, wherein the steering system includes a steering actuator configured to adjust the direction of travel of the agricultural machine.

7. The system of claim 6, wherein a position of the steering actuator is determined based on data provided by a steering sensor.

8. The system of claim 1, wherein the compensation angle is equal to a steering angle defined between the tangent line and the defined target path.

9. The system of claim 1, wherein the first boom section is at least a portion of a boom arm and the second boom section is a central boom section.

10. A method for an operation of an agricultural machine, the method comprising:
    determining, with a machine guidance system, a defined target path for the agricultural machine;
    determining, with a computing system, a tangent line defined as a direction of a steering center point of a chassis of the agricultural machine with a steering system in a defined position;
    determining, with the computing system, a compensation angle defined between an actual boom position and a default boom position based on the defined target path and the tangent line; and
    generating, with the computing system, a boom command to alter a position of a first boom section of a boom assembly relative to a second boom section of the boom assembly based on the compensation angle.

11. The method of claim 10, wherein the boom assembly includes one or more nozzle assemblies.

12. The method of claim 10, further comprising:
    executing, with the computing system, the boom command by actuating one or more actuators.

13. The method of claim 10, further comprising:
    receiving, from a positioning device, location data representative of a position of the chassis in a field;
    retrieving, with the computing system, map data defining the defined target path for the agricultural machine;
    determining, with the computing system, a projected path relative to the defined target path based on a set of points on alternating sides of the defined target path; and
    generating, with the computing system, a steering command based on the projected path.

14. The method of claim 13, further comprising:
    executing, with the computing system, the steering command by the steering system of the agricultural machine to steer the agricultural machine along a path that corresponds to an oscillatory path.

15. The method of claim 10, wherein the compensation angle is equal to a steering angle defined between the tangent line and the defined target path.

16. A system for an agricultural machine comprising:
    a steering system configured to alter a steering direction of a chassis;

a guidance system operably coupled with the steering system and configured to alter the steering direction of the agricultural machine based on a defined target path for the agricultural machine;

a boom assembly operably coupled with the chassis;

one or more actuators operably coupled with the boom assembly and configured to alter a first boom section relative to a second boom section; and a computing system communicatively coupled to the steering system, the computing system being configured to:

receive the defined target path from the guidance system;

determine a projected path about the defined target path based on a set of points on alternating sides of the defined target path;

generate a steering command based on the projected path; and     generate a boom command to alter a position of the first boom section relative to the second boom section based at least in part on the steering command and the projected path.

17. The system of claim 16, further comprising:

determine a tangent line defined as a direction of a steering center point of the chassis with the steering system in a defined position along the projected path.

18. The system of claim 17, wherein the boom command is a compensation angle defined between an actual boom position and a default boom position based on the defined target path and the tangent line.

19. The system of claim 18, wherein the compensation angle is equal to a steering angle defined between the tangent line and a defined target path.

20. The system of claim 16, wherein a compensation angle places at least a portion of the boom assembly in a position that is perpendicular to the defined target path.

* * * * *